United States Patent
Meier et al.

(10) Patent No.: US 10,259,892 B2
(45) Date of Patent: Apr. 16, 2019

(54) POLYETHYLENE COMPOSITION FOR INJECTION MOULDING

(71) Applicant: Basell Polyolefine GmbH, Wesseling (DE)

(72) Inventors: Gerhardus Meier, Frankfurt (DE); Ulf Schüller, Frankfurt (DE); Harilaos Mavridis, Lebanon, OH (US); Bernd Lothar Marczinke, Frankfurt (DE); Diana Dötsch, Bad Kreuznach (DE); Jens Wiesecke, Zwingenberg (DE)

(73) Assignee: Basell Polyolefine GmbH, Wesseling (DE)

( * ) Notice: Subject to any disclaimer, the term of this patent is extended or adjusted under 35 U.S.C. 154(b) by 7 days.

(21) Appl. No.: 15/320,701

(22) PCT Filed: Jun. 17, 2015

(86) PCT No.: PCT/EP2015/063624
§ 371 (c)(1),
(2) Date: Dec. 20, 2016

(87) PCT Pub. No.: WO2015/197453
PCT Pub. Date: Dec. 30, 2015

(65) Prior Publication Data
US 2017/0198069 A1    Jul. 13, 2017

Related U.S. Application Data

(60) Provisional application No. 62/016,508, filed on Jun. 24, 2014.

(51) Int. Cl.
| | | |
|---|---|---|
| *C08L 23/06* | (2006.01) | |
| *C08F 10/02* | (2006.01) | |
| *C08L 23/08* | (2006.01) | |

(52) U.S. Cl.
CPC ............... *C08F 10/02* (2013.01); *C08L 23/06* (2013.01); *C08L 23/0815* (2013.01); *C08L 2205/02* (2013.01); *C08L 2205/025* (2013.01)

(58) Field of Classification Search
CPC .......... C08F 210/16; C08F 2/001; C08F 2/34; C08F 210/14; C08F 10/02; C08F 2500/13; C08F 2500/07; C08L 23/06; C08L 23/0815; C08L 2205/025; C08L 2205/02

See application file for complete search history.

(56) References Cited

U.S. PATENT DOCUMENTS

| | | |
|---|---|---|
| 7,230,054 B2 | 6/2007 | Mavridis et al. |
| 7,560,524 B2 | 7/2009 | Michie, Jr. et al. |
| 7,807,096 B2 | 10/2010 | Maziers |
| 8,067,518 B2 | 11/2011 | Davey et al. |
| RE43,004 E † | 12/2011 | DeGroot |
| 8,552,136 B2 † | 10/2013 | Papp |
| 8,709,560 B2 | 4/2014 | Iyer et al. |
| 8,821,995 B2 | 9/2014 | Chai et al. |
| 9,090,761 B2 | 7/2015 | Mannebach et al. |
| 2005/0288443 A1 | 12/2005 | Mavridis et al. |
| 2010/0304052 A1† | 12/2010 | Chai |

FOREIGN PATENT DOCUMENTS

| | | |
|---|---|---|
| CN | 1585693 A | 2/2005 |
| CN | 1950445 A | 4/2007 |
| CN | 1972972 A | 5/2007 |
| CN | 101048455 A | 10/2007 |
| CN | 101107310 A | 1/2008 |
| CN | 101490115 A | 7/2009 |
| CN | 101516931 A | 8/2009 |
| CN | 102197081 A | 9/2011 |
| RU | 2010137631 A | 3/2012 |

OTHER PUBLICATIONS

PCT International Search Report & Written Opinion dated Jul. 21, 2015 for PCT/EP2015/063624.
Lu Bai, et al., Rheological Behavior and Mechanical Properties of High-Density Polyethylene Blends with Different Molecular Weights, Journal of Applied Polymer Science, vol. 118, 1356-1363 (2010), © 2010 Wiley Periodicals, Inc.†

† cited by third party

*Primary Examiner* — Nathan M Nutter

(57) ABSTRACT

Polyethylene composition for injection molding with a beneficial balance of environmental stress cracking resistance and impact resistance in combination with low warpage and beneficial processing behavior, said composition having the following features:
1) density of 0.945 g/cm³ or higher;
2) MIE from 1 to 30 g/10 min.;
3) ratio MIF/MIE from 15 to 30;
4) ER values from 0.40 to 0.52.

6 Claims, 1 Drawing Sheet

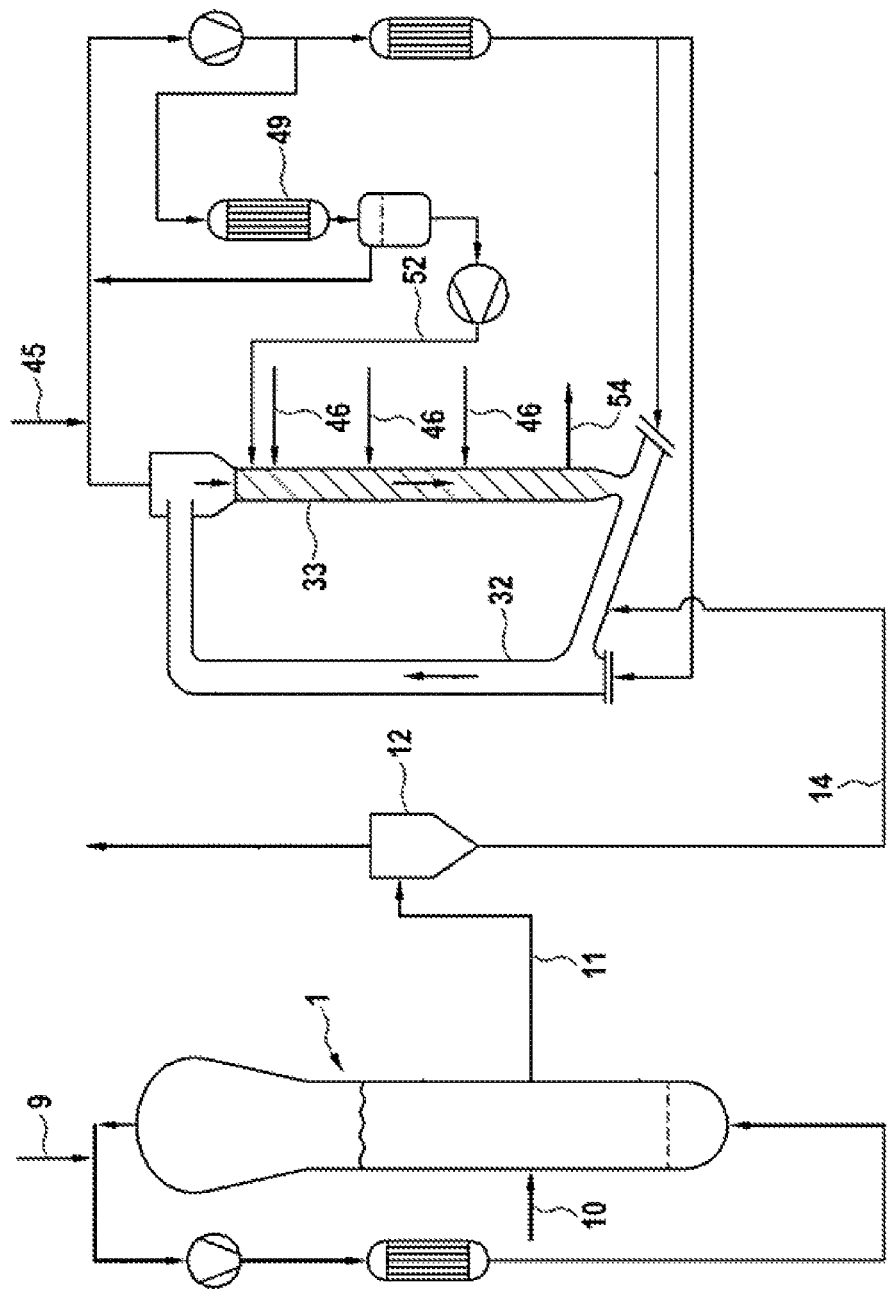

POLYETHYLENE COMPOSITION FOR INJECTION MOULDING

This application is the U.S. National Phase of PCT International Application PCT/EP2015/063624, filed Jun. 17, 2015, claiming benefit of priority to U.S. Provisional Patent Application No. 62/016,508, filed Jun. 24, 2014, the disclosures of which are incorporated herein by reference in their entirety.

FIELD OF THE INVENTION

The present disclosure relates to a novel polyethylene compositions. More specifically, the present disclosure relates to polyethylene compositions that may be used for injection molding, with beneficial processing behavior.

BACKGROUND OF THE INVENTION

Injection molding is a molding technique that can be used for molding small to large objects. A mold can be generated in dedicated injection molding machines comprising a rotating screw in a barrel. The mold can be injected continuously or with a mold buffer by means of pressure.

If the injectable object is large and complicated in shape, the pressure may need to be very high in order to completely fill the cavity. Several hot runners can be used to overcome the high pressure level and to generate an even temperature profile while injecting polyethylene, in order to minimize the warpage of the injected objects.

A material with a desired balance of properties such as stress cracking resistance (FNCT) and impact resistance (Charpy) can be beneficial for injection molding. These properties should be balanced to prevent high warpage of the injection molded article, and may provide a lower injection molding pressure which can be beneficial in the production of large, hollow objects and allowing melt-processing at high values of shear rate without undergoing pressure oscillations and flow-instabilities.

SUMMARY OF THE INVENTION

The present disclosure provides a polyethylene composition comprising:
1) a density of 0.945 g/cm$^3$ or higher, such as from 0.945 to 0.97 g/cm$^3$, as determined according to ISO 1183 at 23° C.;
2) MIE from 1 to 30 g/10 min.;
3) an MIF/MIE ratio from 15 to 30, such as from 20 to 29 or from 22 to 29, where MIF is the melt flow index at 190° C. with a load of 21.60 kg, and MIE is the melt flow index at 190° C. with a load of 2.16 kg, both determined according to ISO 1133; and
4) ER values from 0.40 to 0.52.

BRIEF DESCRIPTION OF THE DRAWINGS

These and other features, aspects, and aspects of the present disclosure will become better understood with reference to the following description and appended claims, and accompanying drawing figures where:

The FIGURE is an illustrative embodiment of a simplified process-flow diagram of two serially connected gas-phase reactors for use in accordance with various embodiments of ethylene polymerization processes disclosed herein to produce various embodiments of the polyethylene compositions disclosed herein.

It should be understood that the various embodiments are not limited to the arrangements and instrumentation shown in the drawing figures.

DETAILED DESCRIPTION OF THE INVENTION

The expression "polyethylene composition" is intended to embrace, as alternatives, both a single ethylene polymer and an ethylene polymer composition, such as a composition of two or more ethylene polymer components, with different molecular weights, such composition being also called "bimodal" or "multimodal" polymer.

The polyethylene composition of the present disclosure can consist of or comprise one or more ethylene homopolymers, such as two ethylene homopolymers. It can also consist of or comprise one or more ethylene copolymers, including an ethylene homopolymer and an ethylene copolymer or two ethylene copolymers.

In one embodiment, in the polyethylene composition of the present disclosure the above defined fractions A) and B) are both ethylene homopolymers.

In an alternative embodiment, fraction A) is an ethylene homopolymer or copolymer and fraction B) is an ethylene copolymer.

The comonomer or comonomers present in the ethylene copolymers can be olefins having the formula $CH_2=CHR$ wherein R may be an alkyl radical, linear or branched, having from 1 to 10 carbon atoms.

Specific examples are propylene, butene-1, pentene-1, 4-methylpentene-1, hexene-1, octene-1 and decene-1.

The addition of other components, like the additives normally employed in the art, can modify one or more of said features.

Specific ranges of density for the polyethylene composition of the present disclosure include:
from 0.950 to 0.970 g/cm$^3$;
from 0.952 to 0.970 g/cm$^3$;
from 0.955 to 0.970 g/cm$^3$; and
from 0.960 to 0.970 g/cm$^3$.

Specific ranges of MIE for the polyethylene composition of the present disclosure include:
from 1 to 25 g/10 min., or from 1 to 20 g/10 min.;
from 2 to 25 g/10 min., or from 2 to 20 g/10 min.;
from 3 to 25 g/10 min., or from 3 to 20 g/10 min.;
from 5 to 25 g/10 min., or from 5 to 20 g/10 min.; and
from 6 to 25 g/10 min., or from 6 to 20 g/10 min.

The ratio MIF/MIE may provide a rheological measure of molecular weight distribution.

Additional information on the molecular weight distribution can be provided by the rheological polydispersity ER, which can be determined from plots of storage modulus (G') versus loss modulus (G") and can be a measure of high-molecular-weight-end polydispersity. The polyethylene composition of the present disclosure may have ER values from 0.42 to 0.52.

Polyethylene compositions of the present disclosure can be prepared by a gas phase polymerization process in the presence of a Ziegler-Natta catalyst.

A Ziegler-Natta catalyst may comprise the product of the reaction of an organometallic compound of Groups 1, 2 and 13 of the Periodic Table of Elements with a transition metal compound of Groups 4 to 10 of the Periodic Table of Elements (new notation). The transition metal compound can be selected among compounds of Ti, V, Zr, Cr and Hf and may be supported on $MgCl_2$.

Catalysts disclosed herein may result from the product of the reaction of said organometallic compound of Groups 1, 2 and 13 of the Periodic Table of Elements, with a solid catalyst component comprising a Ti compound and an electron donor compound (ED) supported on $MgCl_2$.

Organometallic compounds can be the organo-Al compounds.

Thus, the polyethylene composition of the present disclosure can be obtained by using a Ziegler-Natta polymerization catalyst supported on $MgCl_2$, including a Ziegler-Natta catalyst comprising the product of reaction of:
  a) a solid catalyst component comprising a Ti compound and an electron donor compound ED supported on $MgCl_2$;
  b) an organo-Al compound; and optionally
  c) an external electron donor compound $ED_{ext}$.

In component a) the ED/Ti molar ratio may range from 1.5 to 3.5 and the Mg/Ti molar ratio may be higher than 5.5, such as from 6 to 80.

Suitable titanium compounds can be the tetrahalides or the compounds of formula $TiX_n(OR^1)_{4-n}$, where $0 \leq n \leq 3$, X can be a halogen, such as chlorine, and $R^1$ can be a $C_1$-$C_{10}$ hydrocarbon group.

The ED compound can be selected from alcohol, ketones, amines, amides, nitriles, alkoxysilanes, aliphatic ethers, and esters of aliphatic carboxylic acids.

The ED compound can be selected from among amides, esters and alkoxysilanes.

Specific examples of esters that may be used as electron donor compounds are the alkyl esters of $C_1$-$C_{20}$ aliphatic carboxylic acids and $C_1$-$C_8$ alkyl esters of aliphatic mono carboxylic acids such as ethylacetate, methyl formiate, ethylformiate, methylacetate, propylacetate, i-propylacetate, n-butylacetate, and i-butylacetate. Moreover, aliphatic ethers including $C_2$-$C_{20}$ aliphatic ethers, such as tetrahydrofuran (THF) or dioxane can also be used. In the solid catalyst component $MgCl_2$ can be the basic support, even if minor amounts of additional carriers are used. $MgCl_2$ can be used as such or obtained from Mg compounds used as precursors that can be transformed into $MgCl_2$ by reaction with halogenating compounds. Magnesium dihalides in active form used as support or co-support in components of catalysts for the polymerization of olefins can be characterized by X-ray spectra in which the most intense diffraction line that appears in the ASTM-card reference of the spectrum of the non-active halide may be diminished in intensity and broadened. In the X-ray spectra of magnesium dihalides in active form the most intense line may be diminished in intensity and replaced by a halo whose maximum intensity may be displaced towards lower angles relative to that of the most intense line.

As previously mentioned, the solid catalyst component can be converted into catalysts for the polymerization of olefins by reacting it with an organometallic compound of Groups 1, 2 and 13 of the Periodic Table of Elements, including with an Al-alkyl compound.

The alkyl-Al compound can be chosen among the trialkyl aluminum compounds such as for example triethylaluminum, triisobutylaluminum, tri-n-butylaluminum, tri-n-hexylaluminum, and tri-n-octylaluminum. It may also be possible to use alkylaluminum halides, alkylaluminum hydrides or alkylaluminum sesquichlorides such as $AlEt_2Cl$ and $Al_2Et_3Cl_3$, optionally in mixture with trialkyl aluminum compounds.

The external electron donor compound $ED_{ext}$ used to prepare the Ziegler-Natta catalysts can be equal to or different from the ED used in the solid catalyst component a).

The ED may be selected from the group including ethers, esters, amines, ketones, nitriles, silanes and their mixtures. It may also be selected from the $C_2$-$C_{20}$ aliphatic ethers, including cyclic ethers having 3-5 carbon atoms such as tetrahydrofuran and dioxane.

The polyethylene composition of the present disclosure can be obtained by a process wherein all the polymerization steps may be carried out in the presence of the catalyst.

By using the above described polymerization catalyst, the polyethylene composition of the present disclosure can be prepared in a process comprising the following steps, in any order:
  a) polymerizing ethylene, including with one or more comonomers, in a gas-phase reactor in the presence of hydrogen;
  b) polymerizing ethylene, including together with one or more comonomers, in another gas-phase reactor in the presence of an amount of hydrogen less than step a);
where, in at least one of said gas-phase reactors, the growing polymer particles flow upward through a first polymerization zone (riser) under fast fluidization or transport conditions, leave the riser and enter a second polymerization zone (downcomer) through which growing polymer particles flow downward under the action of gravity, leave the downcomer and are reintroduced into the riser, thus establishing a circulation of polymer between the two polymerization zones.

In the first polymerization zone (riser), fast fluidization conditions may be established by feeding a gas mixture comprising one or more olefins (ethylene and comonomers) at a velocity higher than the transport velocity of the polymer particles. The velocity of said gas mixture can be comprised between 0.5 and 15 m/s, including between 0.8 and 5 m/s. The terms "transport velocity" and "fast fluidization conditions" may be defined in literature such as "D. Geldart, Gas Fluidisation Technology, page 155 et seq., J. Wiley & Sons Ltd., 1986". In the second polymerization zone (downcomer), the polymer particles can flow under the action of gravity in a densified form, so that high values of density of the solid may be reached (mass of polymer per volume of reactor), which approach the bulk density of the polymer.

In other words, the polymer flows vertically down through the downcomer in a plug flow (packed flow mode), so that only small quantities of gas may be entrained between the polymer particles.

Such a process from step a) may produce an ethylene polymer with a molecular weight lower than the ethylene copolymer obtained from step b).

The operating temperature in the reactor of step a) may be between 50 and 120° C., while the operating pressure may be between 0.5 and 10 MPa.

The ethylene polymer coming from step a) and the entrained gas can then be passed through a solid/gas separation step, in order to prevent the gaseous mixture coming from the first polymerization reactor from entering the reactor of step b) (second gas-phase polymerization reactor). The gaseous mixture can be recycled back to the first polymerization reactor, while the separated ethylene polymer can be fed to the reactor of step b). A suitable point of feeding of the polymer into the second reactor may be on the connecting part between the downcomer and the riser, wherein the solid concentration may be particularly low, so that the flow conditions may not be negatively affected.

The operating temperature in step b) can be in the range of 65 to 95° C., and the pressure can be in the range of 1.5 to 4.0 MPa.

The second gas-phase reactor can be operated to produce a relatively high molecular weight ethylene polymer. Furthermore, in order to control the molecular weight distribution of the final ethylene polymer, the reactor of step b) can be conveniently operated by establishing different conditions of monomers and hydrogen concentration within the riser and the downcomer.

The polymer particles coming from the downcomer may be reintroduced in the riser of step b).

The following examples are given to illustrate, without limiting, the present disclosure.

EXAMPLES

Unless otherwise stated, the following test methods are used to determine the properties reported in the detailed description and in the examples.

Density
Determined according to ISO 1183 at 23° C.

Melt Flow Index
Determined according to ISO 1133 at 190° C. with the specified load.

Environmental Stress Cracking Resistance According to Full Notch Creep Test (FNCT)

The environmental stress cracking resistance of polymer samples is determined in accordance to international standard ISO 16770 (FNCT) in aqueous surfactant solution. From the polymer sample a compression molded, 10 mm thick sheet is prepared. The bars with squared cross section (10×10×100 mm) are notched using a razor blade on four sides perpendicular to the stress direction. A notching device as described in M. Fleissner in Kunststoffe 77 (1987), pp. 45 can be used for the sharp notch with a depth of 1.6 mm. The load applied is calculated from tensile force divided by the initial ligament area. The ligament area is the remaining area=total cross-section area of specimen minus the notch area. For FNCT specimen: 10×10 mm$^2$–4 times of trapezoid notch area=46.24 mm$^2$ (the remaining cross-section for the failure process/crack propagation). The test specimen is loaded with standard conditions suggested by the ISO 16770 with constant load of 6 MPa at 50° C. in an aqueous solution of 2% by weight of ARKOPAL N100 and 5% of anionic surfactant GENAPOL Paste. Time until rupture of test specimen is detected.

Charpy aCN

Fracture toughness determination is by an internal method on test bars measuring 10×10×80 mm which has been taken out of a compression molded sheet with a thickness of 10 mm. Six of these test bars are notched in the center using a razor blade in the notching device mentioned above for FNCT. The notch depth is 1.6 mm. The measurement can be carried out substantially in accordance with the Charpy measurement method in accordance with ISO 179-1, with modified test specimens and modified impact geometry (distance between supports). All test specimens are conditioned to the measurement temperature of −30° C. over a period of from 2 to 3 hours. A test specimen is then placed without delay onto the support of a pendulum impact tester in accordance with ISO 179-1. The distance between the supports is 60 mm. The drop of the 2 J hammer is triggered, with the drop angle being set to 160°, the pendulum length to 225 mm and the impact velocity to 2.93 m/s. The fracture toughness value is expressed in kJ/m$^2$ and is given by the quotient of the impact energy consumed and the initial cross-sectional area at the notch, aCN. Values for complete fracture and hinge fracture can be used here as the basis for a common meaning (see suggestion by ISO 179-1).

Rheological Measurements and Calculations

Rheological measurements are performed in accordance with ASTM 4440-95a, which measures dynamic rheology data in the frequency sweep mode. A Rheometrics ARES rheometer is used. It is operated in the parallel plate mode (plate diameter 50 mm) in a nitrogen environment to minimize sample oxidation/degradation with a gap in the parallel plate geometry of 1.2-1.4 mm and strain amplitude of 10%. Frequencies range from 0.0251 to 398.1 rad/sec.

ER is determined by the method of R. Shroff and H. Mavridis, "New Measures of Polydispersity from Rheological Data on Polymer Melts," J. Applied Polymer Science 57 (1995) 1605 (see also U.S. Pat. No. 5,534,472 at Column 10, lines 20-30). Storage modulus (G') and loss modulus of (G") are measured. The nine lowest frequency points are used (five points per frequency decade) and a linear equation is fitted by least-squares regression to log G' versus log G". ER is then calculated from:

$$ER=(1.781*10^{-3})*G'$$

at a value of G"=5,000 dyn/cm$^2$.

When the lowest G" value is greater than 5,000 dyn/cm$^2$, the determination of ER may involve extrapolation. The ER values calculated then will depend on the degree on non-linearity in the log G' versus log G" plot. The temperature, plate diameter and frequency range are selected such that, within the resolution of the rheometer, the lowest G" value is close to or less than 5,000 dyne/cm$^2$.

Examples 1-2 and Comparative Examples 1-3

Process Setup

In Examples 1 and 2 the process of this disclosure was carried out under continuous conditions in a plant comprising two serially connected gas-phase reactors, as shown in the FIGURE.

Example 1

The solid catalyst component was prepared as described in Example 13 of WIPO Pat. App. Pub. No. WO 2004/106388. The AcOEt/Ti molar ratio was 8.

Polymerization 9 g/h of the solid catalyst component prepared as described above were fed, using 5 kg/h of liquid propane, to a pre-contacting apparatus, in which also triethylaluminum (TEAL) as well as tetrahydrofuran (THF) were dosed. The weight ratio between aluminum alkyl and solid catalyst component was 6:1. The weight ratio between aluminum alkyl and THF was 20. The pre-contacting step was carried out under stirring at 50° C. with a total residence time of 120 minutes.

The catalyst enters the first gas-phase polymerization reactor 1 of the FIGURE via line 10. In the first reactor ethylene was polymerized using H2 as molecular weight regulator and in the presence of propane as inert diluent. 60 kg/h of ethylene and 65 g/h of hydrogen were fed to the first reactor via line 9. No comonomer was fed to the first reactor.

The polymerization was carried out at a temperature of 80° C. and at a pressure of 2.9 MPa. The polymer obtained in the first reactor was discontinuously discharged via line 11, separated from the gas into the gas/solid separator 12, and reintroduced into the second gas-phase reactor via line 14.

The polymer produced in the first reactor had a melt index MIE of about 8 g/10 min and a density of 0.966 kg/dm$^3$.

The second reactor was operated under polymerization conditions of about 80° C., and a pressure of 2.5 MPa. 8 kg/h of ethylene were introduced in the downcomer 33 of the second reactor via line 46. 5 kg/h of propane, 17.5 kg/h of ethylene and 30 g/h of hydrogen were fed through line 45 into the recycling system.

The second reactor was operated to keep the molecular weight distribution narrow by establishing similar conditions for monomers and hydrogen concentration within the riser 32 and the downcomer 33. This was achieved by feeding via line 52, 75 kg/h of a liquid stream (liquid barrier) into the upper part of the downcomer 33. The liquid stream had a composition different from that of the gas mixture present in the riser. The different concentrations of monomers and hydrogen within the riser, the downcomer of the second reactor and the composition of the liquid barrier are indicated in Table 1. The liquid stream of line 52 comes from the condensation step in the condenser 49, at working conditions of 50° C. and 2.5 MPa, wherein a part of the recycle stream was cooled and partially condensed. As shown in the figure, a separating vessel and a pump were placed, in order, downstream of the condenser 49. The final polymer was discontinuously discharged via line 54.

In Table 1 the properties of the final product are specified. The first reactor produced around 70% by weight (split wt %) of the total amount of the final polyethylene resin produced by both first and second reactors.

Example 2

The process of this disclosure was carried out with the same setup and the same polymerization catalyst of Example 1. 10 g/h of the solid catalyst component prepared as described above were fed, using 5 kg/h of liquid propane, to a pre-contacting apparatus, into which triethylaluminum (TEAL) as well as tetrahydrofuran (THF) were dosed. The weight ratio of aluminum alkyl to solid catalyst component was 6:1. The weight ratio between aluminum alkyl and THF was 20. The pre-contacting step was carried out under stirring at 50° C. with a total residence time of 120 minutes.

The catalyst entered the first gas-phase polymerization reactor 1 of the FIGURE via line 10. In the first reactor ethylene was polymerized using H2 as molecular weight regulator and in the presence of propane as inert diluent. 60 kg/h of ethylene and 55 g/h of hydrogen were fed to the first reactor via line 9. 1.1 kg/h of hexene was fed to the first reactor.

The polymerization was carried out at a temperature of 80° C. and at a pressure of 2.9 MPa. The polymer obtained in the first reactor was discontinuously discharged via line 11, separated from the gas into the gas/solid separator 12, and reintroduced into the second gas-phase reactor via line 14.

The polymer produced in the first reactor had a melt index MIE of about 6.5 g/10 min and a density of 0.952 kg/dm$^3$.

The second reactor was operated under polymerization conditions of about 80° C., and a pressure of 2.5 MPa. 8 kg/h of ethylene and 0.5 kg/h of 1-hexene were introduced in the downcomer of the second reactor via line 46. 5 kg/h of propane, 17.5 kg/h of ethylene and 180 g/h of hydrogen were fed through line 45 into the recycling system.

The second reactor was operated to keep the molecular weight distribution narrow by establishing similar conditions of monomers and hydrogen concentration within the riser 32 and the downcomer 33. This is achieved by feeding via line 52, 75 kg/h of a liquid stream (liquid barrier) into the upper part of the downcomer 33. The liquid stream has a composition different from that of the gas mixture present in the riser. The different concentrations of monomers and hydrogen within the riser, the downcomer of the second reactor and the composition of the liquid barrier are indicated in Table 1. The liquid stream of line 52 comes from the condensation step in the condenser 49, at working conditions of 50° C. and 2.5 MPa, wherein a part of the recycle stream was cooled and partially condensed. As shown in the figure, a separating vessel and a pump were placed, in order, downstream of the condenser 49. The final polymer was discontinuously discharged via line 54.

The first reactor produced around 69% by weight (split weight %) of the total amount of the final polyethylene resin produced by both the first and second reactors.

Comparative Examples 1-3

The polymers of these comparative examples were polyethylene compositions.

Comparative Examples 1 and 3 were prepared in a slurry polymerization, with a titanium-based Ziegler catalyst.

Such polymers are sold by LyondellBasell with the trademarks Alathon™ M6580 (homopolymer) and Alathon™ M5265X01 (copolymer), respectively.

The polymer of Comparative Example 2 was a copolymer prepared in a Philips slurry loop using a Ziegler catalyst.

TABLE 1

|  | Ex. 1 | Ex. 2 | Comp. Ex. 1 | Comp. Ex. 2 | Comp. Ex. 3 |
|---|---|---|---|---|---|
| Operative conditions first reactor |  |  | — | — | — |
| $H_2/C_2H_4$ Molar ratio | 1.1 | 0.8 | — | — | — |
| $C_2H_4$ % | 16 | 16 | — | — | — |
| $C_6H_{12}$ % | 0 | 0.5 | — | — | — |
| Split (wt %) | 70 | 69 | — | — | — |
| Operative conditions second reactor |  |  |  |  |  |
| $H_2/C_2H_4$ Molar ratio riser | 1.2 | 0.81 | — | — | — |
| $C_2H_4$ % riser | 12.8 | 12.1 | — | — | — |
| $C_6H_{12}$ riser | 0 | 0.2 | — | — | — |
| $H_2/C_2H_4$ Molar ratio downer | 1.4 | 1.1 | — | — | — |
| $C_2H_4$ % downer | 4.8 | 5.0 | — | — | — |
| $C_6H_{12}$ downer | 0 | 0.45 | — | — | — |
| $H_2/C_2H_4$ Molar ratio barrier | 0.12 | 0.1 | — | — | — |
| $C_2H_4$ % barrier | 5.3 | 4.4 | — | — | — |
| $C_6H_{12}$ barrier | 0 | 2 | — | — | — |
| Final Polymer properties |  |  |  |  |  |
| MIE (g/10 min.) | 8.5 | 7 | 8.9 | 6.8 | 6.6 |
| MIF/MIE | 24.7 | 25.3 | 30.1 | 23.4 | 21.1 |
| Density (g/cm$^3$) | 0.966 | 0.952 | 0.965 | 0.952 | 0.952 |
| FNCT @ 50° C., 6 MPa (h) | 2.1 | 3.1 | <1 | 2.9 | 1.8 |
| Charpy aCN (kJ/m$^2$) | 4.1 | 4.3 | 4.1 | 4.3 | 4.8 |
| ER | 0.46 | 0.48 | 0.95 | 0.55 | 0.54 |

Table 1 shows that, for comparable density values, the polyethylene composition of the disclosure has improved FNCT/Charpy balance.

Example 1 exhibits improved FNCT as compared to Comparative Example 1, with a comparable Charpy value.

In Comparative Example 2 the Charpy value is the same as in Example 2, but with a lower FNCT value.

In Comparative Example 3, the Charpy value is increased, but the FNCT value is decreased. The FNCT/Charpy balance of the polyolefin composition of the present disclosure is beneficially improved.

For both Example 1 and Example 2 (according to this disclosure) the FNCT/impact balance could be achieved with a lower ER value (i.e. narrower rheological polydispersity) versus comparative examples.

The invention claimed is:

1. A polyethylene composition comprising:
   a) a density of 0.945 g/cm$^3$ or higher;
   b) an MIE from 1 to 30 g/10 min.;
   c) a MIF/MIE ratio from 15 to 30, where MIF is the melt flow index at 190° C. with a load of 21.60 kg, and MIE is the melt flow index at 190° C. with a load of 2.16 kg, both determined according to ISO 1133; and
   d) an ER value from 0.40 to 0.52,
   wherein the polyethylene composition is multimodal.

2. The polyethylene composition of claim 1, further comprising one or more ethylene homopolymers.

3. The polyethylene composition of claim 1, further comprising one or more ethylene copolymers.

4. The polyethylene composition of claim 3, wherein the comonomer or comonomers present in the ethylene copolymers comprise olefins having the formula $CH_2$=CHR, wherein R is an alkyl radical, linear or branched, having from 1 to 10 carbon atoms.

5. The polyethylene composition of claim 1, wherein the polyethylene composition is produced by reacting ethylene in the presence of a Ziegler-Natta polymerization catalyst.

6. An injection molded article comprising the polyethylene composition of claim 1.

* * * * *

UNITED STATES PATENT AND TRADEMARK OFFICE
CERTIFICATE OF CORRECTION

PATENT NO. : 10,259,892 B2
APPLICATION NO. : 15/320701
DATED : April 16, 2019
INVENTOR(S) : Meier et al.

It is certified that error appears in the above-identified patent and that said Letters Patent is hereby corrected as shown below:

In the Specification

In Column 3, Line 32, delete "methyl formiate," and insert -- methyl formate, --, therefor
In Column 3, Line 32, delete "ethyl formiate," and insert -- ethyl formate, --, therefor Signed and Sealed this
Nineteenth Day of September, 2023

Katherine Kelly Vidal
*Director of the United States Patent and Trademark Office*